United States Patent [19]

Durand

[11] 3,936,131

[45] Feb. 3, 1976

[54] SNAP-IN ASSEMBLY AND CONTACT TERMINAL FOR WEDGE BASE LAMPS

[75] Inventor: Remie P. Durand, Detroit, Mich.

[73] Assignee: Chrysler Corporation, Highland Park, Mich.

[22] Filed: Nov. 25, 1974

[21] Appl. No.: 526,770

Related U.S. Application Data

[63] Continuation-in-part of Ser. No. 343,339, March 21, 1973, abandoned.

[52] U.S. Cl. ........... 339/128; 339/176 L; 339/217 S

[51] Int. Cl.[2] ...................... H02B 1/02; H01R 13/42

[58] Field of Search .... 339/14 R, 14 T, 17 D, 61 R, 339/61 M, 61 L, 59 L, 125 L, 126 R, 126 RS, 128, 176 L, 217 S

[56] References Cited

UNITED STATES PATENTS

| | | | |
|---|---|---|---|
| 2,318,650 | 5/1943 | Penfold | 339/217 S |
| 3,027,537 | 3/1962 | Hess et al. | 339/128 UX |
| 3,037,183 | 5/1962 | Hopkins | 339/217 S |
| 3,283,286 | 11/1966 | Webb et al. | 339/59 L |
| 3,617,984 | 11/1971 | Rossi | 339/176 L X |
| 3,671,923 | 6/1972 | Rieth | 339/176 L X |

FOREIGN PATENTS OR APPLICATIONS

| | | | |
|---|---|---|---|
| 2,009,825 | 5/1969 | France | 339/217 S |
| 2,118,009 | 11/1971 | Germany | 339/176 L |
| 1,247,850 | 9/1971 | United Kingdom | 339/176 L |

*Primary Examiner*—Joseph H. McGlynn
*Assistant Examiner*—Howard N. Goldberg
*Attorney, Agent, or Firm*—Talburtt & Baldwin

[57] ABSTRACT

A snap-in socket for wedge base lamps that avoids the requirement of a quarter turn twist for locking the socket in the panel. Contact members are adaptable to be inserted from either end of the socket. One modification of the contact member utilizes a snap-on hood for providing one electrical return path through a chassis thereby requiring only a single wire to the socket. The contact members further feature wire guide means thereon which function to straighten any bent filament wires on the lamp bulb when the bulb is inserted into the socket assembly.

10 Claims, 16 Drawing Figures

FIG. 1.
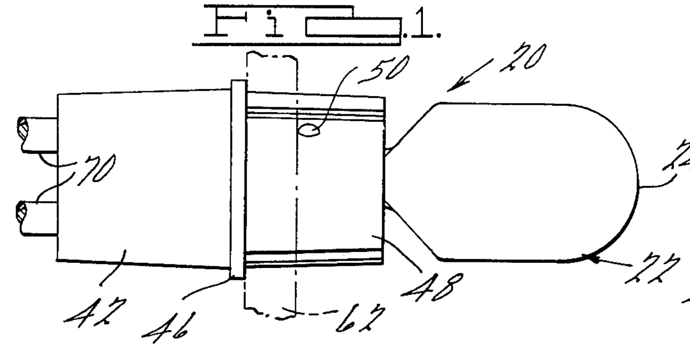
FIG. 2.
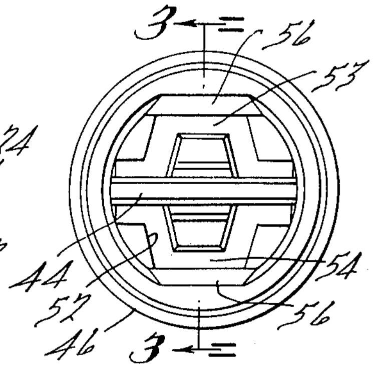
FIG. 3.
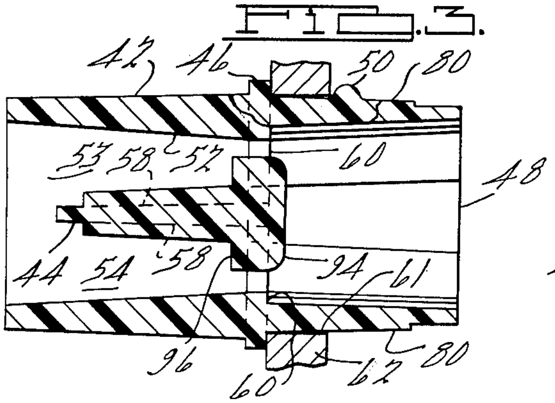
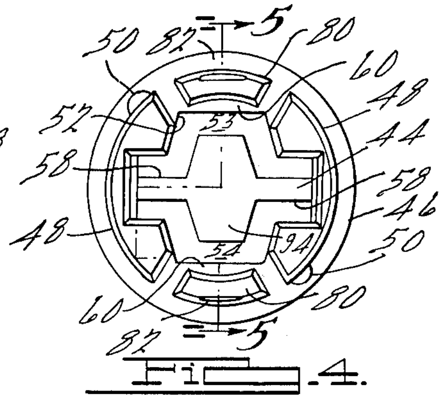
FIG. 4.
FIG. 5.
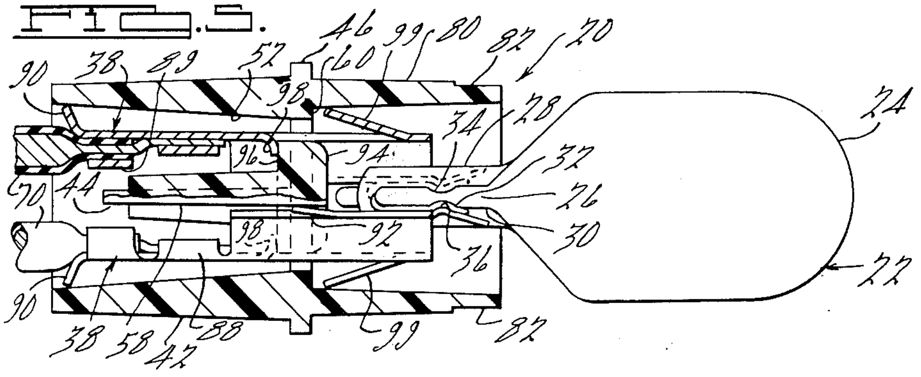
FIG. 6.
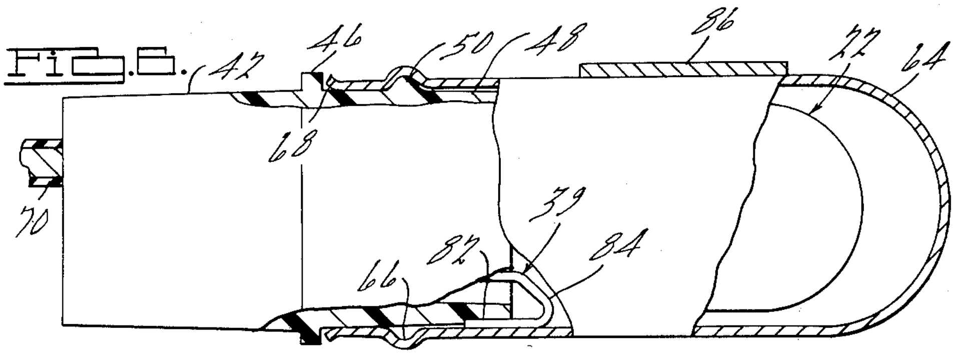

FIG. 11.
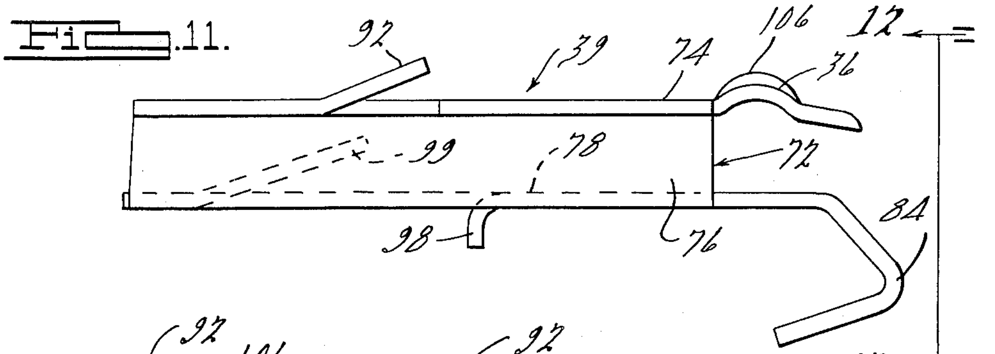
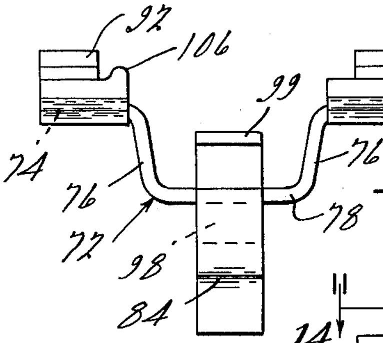
FIG. 12.
FIG. 13.
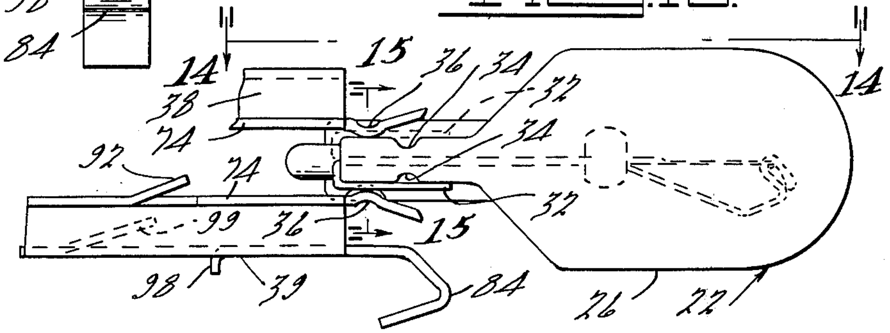
FIG. 14.
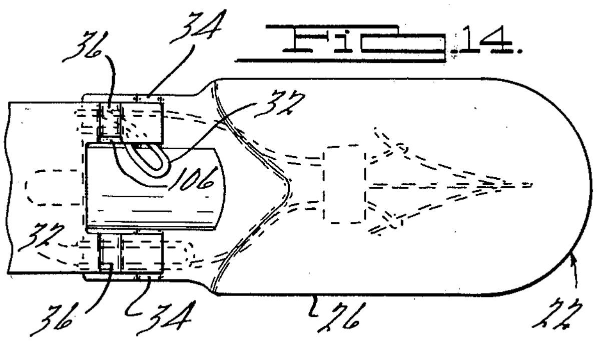
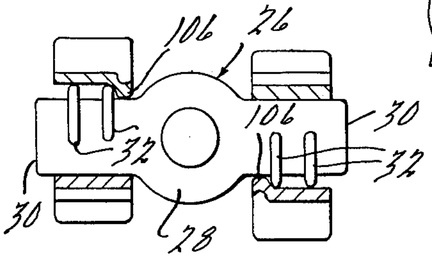
FIG. 15.
FIG. 14A.
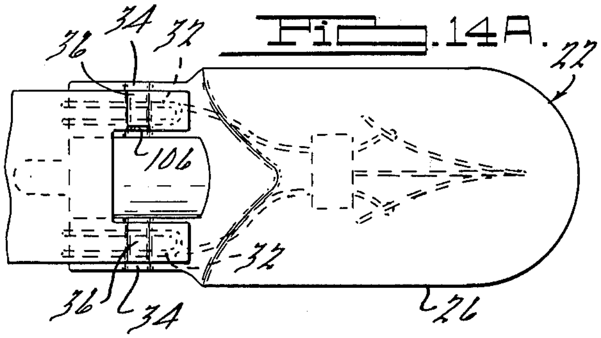

SNAP-IN ASSEMBLY AND CONTACT TERMINAL FOR WEDGE BASE LAMPS

CROSS REFERENCE TO RELATED APPLICATIONS

This application is a continuation-in-part of copending application Ser. No. 343,339, filed Mar. 21, 1973, now abandoned.

BACKGROUND OF INVENTION

Field of Invention

This invention relates to a snap-in panel mounted lamp socket for wedge base lamps and to improved contact terminals therefor.

PRIOR ART

Prior art lamp sockets for wedge base lamps are inserted into a panel aperture having at least one slot adjacent thereto and then twisted to move a pair of opposing cam locks from out of the slot and over the wall of the aperture. This operation involves fabricating a special non-round configuration on the panel aperture. If the socket is assembled to the panel on an assembly line operation, the act of twisting the socket is often omitted.

Additionally, in previous sockets it was necessary to extend the socket housing to provide support for the lamp or to provide additional structure as a lamp holding sleeve inasmuch as the socket contacts did not grip the lamp with sufficient force.

Oftentimes the filament wires on the wedge base of the lamp are bent resulting in improper electrical contact with the contact members in the socket and inoperative or faulty lamp operation.

SUMMARY OF INVENTION

It is therefore an object of the invention to provide a twistless snap-in socket for a wedge base lamp that will securely hold the lamp by its base without the requirement of additional elements as a socket lamp holding sleeve.

Another object of the invention to provide a contact member that is adapted to be inserted into the socket housing from either end.

Yet another object of the invention is to provide an improved lamp socket member for a wedge based lamp bulb that features filament wire guide means on the contact member for straightening of bent wires on the lamp.

These and other objects and advantages of the snap-in socket will become apparent from the following detailed description, drawings and claims of a snap-in socket assembly for wedge base lamps. The socket is a tubular member having an interior rib dividing the interior of the socket into two longitudinal sections. The one end of the socket member has a pair of cantileverly supported jaws supporting a pair of flat contact members against the base of the lamp. The contact member has a plurality of tabs for securing the contact member in the housing from external forces and to hold the contact from movement within the housing. Wire guide means formed on the contact member serve to guide and straighten the filament wires on the lamp base should they be bent prior to insertion in the lamp socket assembly.

DESCRIPTION OF THE DRAWINGS

In the drawings:

FIG. 1 is an elevation view of the snap-in lamp socket assembly according to the present invention including a lamp;

FIG. 2 is a left-hand end view of the snap-in lamp socket of FIG. 1 with the lamp and contacts removed;

FIG. 3 is a fragmentary sectional view taken along line 3—3 of FIG. 2 and also illustrating the socket snapped into a panel;

FIG. 4 is a right-hand view of the snap-in lamp socket of FIG. 1 with the lamp and contacts removed;

FIG. 5 is a sectional view taken along line 5—5 of FIG. 4 with the contacts in the section and the lamp shown in elevation and illustrating the electrical connection in the socket and the securing of the contact members in the socket;

FIG. 6 is an elevation view of the snap-in lamp socket of FIG. 1 partly in section and illustrating a lamp cover and a modification of one of the contacts;

FIG. 11 is an elevation view of the contact member of FIG. 9 provided with a filament wire guide and straightening structure in accordance with another aspect of the invention;

FIG. 12 is an end view taken in the direction 12—12 of FIG. 11;

FIG. 13 is a fragmentary view of a wedge-type bulb received between a pair of cooperating contact members provided with the wire guide and straightening structure of the invention;

FIG. 14 is a plan view taken in the direction 14—14 of FIG. 13;

FIG. 14A is a view similar to FIG. 14 showing the contact member of FIG. 14 received in position on the wedge based lamp bulb and the straightening action of the wire guide and straightening structure of the contact members of FIGS. 11–15; and FIG. 15 is a sectional end view taken in the direction 15—15 of FIG. 13;

DETAILED DESCRIPTION

Figure 7:
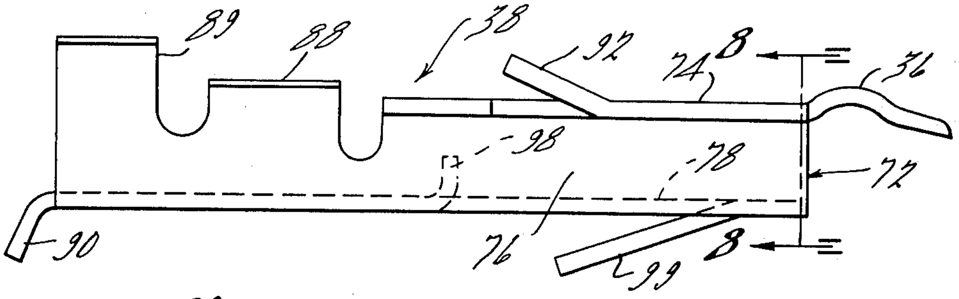
FIG. 7 is an elevation view of one form of contact for the snap-in lamp socket assembly of FIG. 1.

Referring to the FIGS. by the characters of reference, there is illustrated in FIG. 1 an elevation of a snap-in socket assembly 20 for a wedge base bulb or lamp 22. The wedge base lamp, which is well known and manufactured by several lamp manufacturers such as General Electric and Westinghouse, has a bulbular evacuated chamber section 24 fused to a wedge-type base 26. The base configuration includes a raised cylindrical centrally located vent tube portion 28 bounded by laterally extending side wings 30 of substantially flat rectangular cross section, as shown in FIG. 15. Both ends of 32 of the lamp filament extend through and exit out of the bottom end of the side wings and are formed on diagonally opposite surfaces of the wings in such a manner that on either side of the central cylindrical vent tube portion there is only one end of the filament wires, which is bent or looped back upon itself, as indicated in FIG. 14, with its end reentrant in and sealed in the wedge base.

Extending across each side of the side wings transversely to the normal axis of the lamp is a concave detent trough 34. The troughs are in line interrupted only by the central cylindrical portion 28 of the base. The filament extension wires overlie and extend beyond the detent trough 34, as shown in FIGS. 14 and 14A in which the looped filament wire of FIG. 14 is indicated as bent or misaligned and is straightened by the contact member wire guide and straightening structure as depicted in FIG. 14A. It is through a corresponding, mirror image detent 36 on the contacts 38–40 that the lamp is held in a socket and electrical contact is made.

The socket 42 is an elongated tubular housing having an elongated rib 44, which is shown as extending from substantially near one end of the housing to the other end. A rim 46 girds the housing at the other end from which at least two opposed cantileverly supported side panels 48 extend in an axial direction with respect to the housing. A protuberance or dimple 50 is positioned along the outside surface of each of the side panels and is spaced a predetermined distance from the rim 46. A pair of contact members 38–40 are positioned within the housing 42 on either side of the rib 44 forming a lamp receiving throat at the free end of the side panels 48.

The elongated tubular housing 42 in the preferred embodiment, is fabricated from an electrically non-conductive material. Except for the slight molding draft angles, which are necessary for one form of manufacture, the housing is cylindrical in shape having a right circular cross-section. The inside surface 52 of the housing defines a cavity which is divided into two sections 53 and 54 by means of the elongated rib 44. Into each section there is located a portion of the contact member.

Along the inside surface 52 or the walls of the cavity there is a longitudinally flat surface 56 opposite to and parallel with the broadside surfaces 58 of the rib. As will hereinafter be shown, each of these flat surfaces 56 and the opposed broadside surfaces 58 of the rib 44 cooperate with the contact members 38–40 to maintain the contact members out of electrical contact with each other except through the filament of the bulb.

A rim 46 having a rectangular cross-section girds or encircles the housing 42 at the other end. Around the inside surface 52 of the cavity, the rim 46 forms a shoulder 60 at the end of the flat surface 56.

At least two spaced-apart and opposed side panels 48 are cantileverly supported and extend in an axial direction away from the other end or rim end of the housing 42. In the preferred embodiment, these panels 48 are C-shaped in cross-section wherein each C-shaped configuration forms a pair of jaws. The orientation of the side panels 48 is such that if the plane of rib was extended, it would bisect each C-shaped panel or pair of jaws putting one jaw of each pair on each side of the rib. The function of each jaw of the C-shaped panel 48 is to retain and to maintain the contact members in electrical contact with the lamp.

The protuberances 50 along the outer surface of each C-shaped side panel 48 cooperate with the rim 46 for securing the socket within an aperture 61 in a mounting panel 62, as illustrated in FIGS. 1 and 3. In this application, the predetermined distance between the protuberance 50 and the rim 46 is equal to the panel thickness.

The socket 42 is inserted in an aperture 61 having a size equal to the size of the housing and the resiliency of the side panels 48 allows the wall of the aperture 61 to bend the panels toward each other. As the protuberance 50 has passed through the side panel, the latter returns to its normal position, trapping and securing the socket in the aperture 61 with the sides of the panel 62 held between the rim 46 and the protuberance 50.

Another function of the protuberance 50 is illustrated in FIG. 6 wherein the socket assembly 20 of FIG. 1 has a metallic hood member 64 snapped on over the bulb 22. The hood member 64 has an encircling channel 66 confirmong to the size of the protuberance 50. When the hood is positioned over the socket 42, the leading edge 68 of the hood rides over the protuberance 50, causing the side panels 48 to resiliently bend until the protuberance snaps into the channel 66. The hood 64 is then secured to the housing 42.

Figure 9:
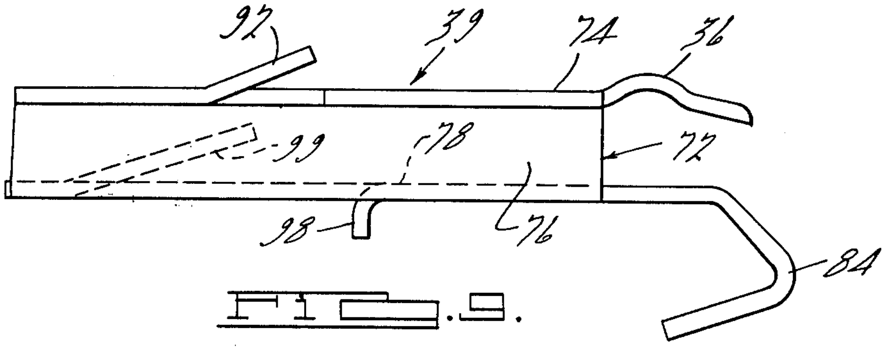
FIG. 9 is an elevation view of one modification of the contact of FIG. 7 that is illustrated in FIG. 6.

A pair of contact members 38–40 complete the socket assembly 20 as illustrated in FIG. 1. Depending upon the application and electrical requirements, the contact members may both have wire leads attached thereto as shown in FIG. 1. This contact 38 embodiment is illustrated in greater detail in FIG. 7. However, when the socket is supported by means of a chassis strap, such as illustrated in FIG. 6, and wherein the chassis provides one electrical connection, such as ground, a contact member 39 as illustrated in FIG. 9 may be used as one of the contact members.

The contact members 38–40 are each located in one section 53 or 54 of the cavity and they extend between the opposed side panels 48. The contact members 38–40 are divided into a lamp receiving end and an opposite end where in the one modification 38 and 40 the circuit wires 70 are attached as by crimping in the wire clinching ferrule-shaped end of that form of contact member. The lamp receiving end is formed into a channel shaped member 72 having a pair of wings 74 extending laterally outwardly from the top surface of the side walls 76 of the channel. The wings 74 are substantially parallel to the base or bottom web 78 of the channel and extend longitudinally beyond the end of the channel. Positioned on each wing and extending beyond the end of the channel is a overhanging and resilient protuberance or detent 36 for meshing with the in-line troughs 34 on the wedge base 26 of the lamp 22. The detents 36 are in-line and extend normal to the longitudinal length of the contact members 38–40.

As indicated above, the contact members are positioned within the housing 42, one on each side of the rib 44, and they extend longitudinally between both pair of jaws 48. The wings 74 of each contact member cooperate with the opposed wings of the opposite contact member to form a lamp or bulb receiving throat. When the wedge base 26 portion of the lamp is inserted between the wings, the jaws resiliently deform outwardly in a direction of opening to allow the base 26 of the lamp 22 to enter. When the troughs 34 on the lamp correspond in position to the detents 36 on the wings 74, the jaws close to compressively mesh the protuberances with the troughs. Once the lamp 22 is in place, the jaws close, applying sufficient force on the wings 74 to hold the lamp without any external holding means. The side panels in the preferred embodiment do not extend to bear or lie in close proximity to the chamber section 24 of the lamp for holding the lamp in the socket. The only holding of the lamp is by the contact members 38–40 cooperating with the jaws 48.

In the preferred socket embodiment, there are positioned two additional side panels 80 interposed in the space between each of the C-shaped jaw side panels. These panels 80 are also cantileverly supported from the rim 46 and extend longitudinally the same length as the C-shaped panels 48. Positioned on the outer surface of each of these two panels is a flat groove or indented surface 82. The groove extends from the end of the panels toward the rim 46 on the housing. The groove cooperates with the modified contact member 38 illustrated in FIG. 9 and the metallic, electrically conducting hood 64 or a chassis strap to locate and to provide a second electrical connection to the socket, as illustrated in FIG. 6.

The contact member 36 illustrated in FIG. 9 has a hook member 84 extending from the bottom web 78 in the direction of the lamp receiving end of the wings 74. This hook member 84 is positioned in the groove 82 of the side panels 80 to make electrical contact with the hood 64 as illustrated in FIG. 6 through a chassis strap 86 to the source of electrical power. As a modification, the end of the hook member could be extended to lie along the housing as far as the rim. In this manner, the contact would make an electrical connection to the panel through the aperture wall.

Figure 8:
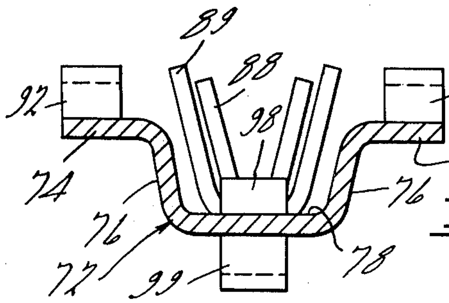
FIG. 8 is a sectional view taken along line 8—8 of FIG. 7.
Figure 10:
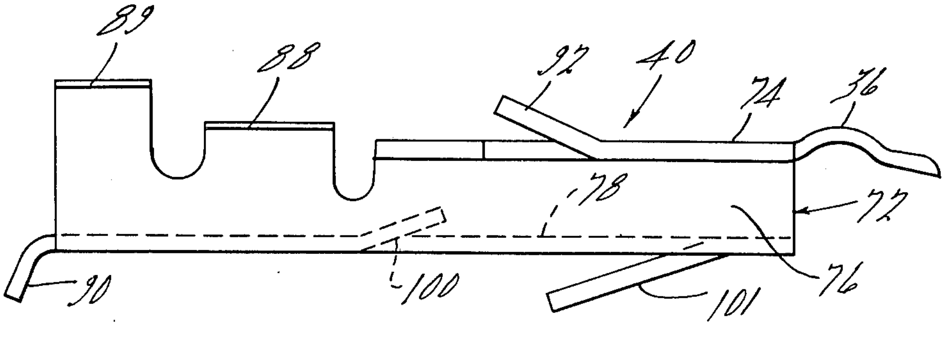
FIG. 10 is an elevation view of another modification of the contact of FIG. 7.

The opposite end of the contact member, illustrated in FIGS. 7, 8, and 10, i.e., the end opposite the lamp receiving end, has a ferrule or wire receiving means formed thereon. In this embodiment, the bottom web 78 of the channel 72 is extended and two spaced apart pairs of crimp members 88 and 89 are formed out of the side walls of the channel. The first pair of members 88 nearest the wing members crimp the conductors of the attached wire while the second pair of members 89 crimp the insulation. The end 90 of the bottom web beyond the second pair of members is formed at a downward depending angle forming a tab extending in a direction opposite to the wing members 74.

Along the top surface of each of the wings a resilient tab 92 is formed extending away from the surface. The tabs are cantileverly supported with the free end extending toward the opposite or wire receiving ferrule end of the contact members 38–40.

These three tabs, one on each wing 92 and the tab 90 at the wire receiving end of the contact member, respectively cooperate with the broadside surface 58 of the rib 44 and the opposed flat surface 56 on the inside of the housing 42 for holding each contact member in a spaced relationship to the opposite contact member. Since the tabs 90 and 92 extend away from the contact member in opposite directions, they also function to keep the contact members snug in the socket and free from relative movement within the socket. The end of the rib 44 near the rim 46 constitutes a stop member 94, which extends into each section defined by the rib 44, as shown in FIGS. 3 and 5. A second stop member is located on the inner surface 52 of the housing at the rim end and may be the shoulder 60 formed at the end of the flat surface 56 by the rim 46. The surface 96 of the first stop member 94 nearest the wire receiving end of the contact members 38, 40 and the surface 60 of the second stop member nearest the lamp receiving throat cooperate with a pair of spaced tabs 98–99 (FIGS. 7, 8 and 9) on the bottom web 78 of the contact members 38 and 39 to securely hold the contact members in the socket from forces applied external to the socket.

In FIGS. 7 and 9 one of the above mentioned spaced tab members 98 is formed at right angles to the bottom web 78 and the other tab member 99 is cantileverly extended from the bottom web in a direction opposite to the extent of the first tab member. The free end of the cantileverly supported member 99 and the bearing surface of the normal tab 98 are spaced apart a distance substantially equal to the longitudinal length between the surfaces 96 and 60 of the two stop members in the housing interior. The direction of insertion of the contact member into the socket determines the relative positioning of the tabs with respect to the lamp receiving ends of contact. The cantileverly extending tab 99 is inserted first into the socket, and the normal tab 98 limits the depth of insertion of the contact member. The tab configuration of FIG. 7 is used when the contact member is inserted from the wire receiving end of the socket. The configuration illustrated in FIG. 9 is used when the contact member is inserted from the lamp receiving end of the socket. Once the contact member is inserted and each tab 98 and 99 is bearing or abutting against its respective stop surfaces 96 and 60, the contact member cannot be removed without damaging the socket, breaking a tab or unless the cantileverly supported tab 99 is depressed toward the web surface.

If the contact member has a wire crimped to the end thereof as illustrated in FIG. 5, the lamp receiving end of the contact is inserted first into the wire receiving end of the housing. The contact member is moved toward and between the jaws on the side panels. The normally extending tab 98 locates on the surface 96 of the first stop member 94, and the free end of the cantileverly extending tab 99 locates on the shoulder surface 60 constituting the second stop member.

Referring to FIG. 10 there is illustrated a modification of the contact member of FIG. 7 wherein both tabs 100 and 101 from the bottom web 78 are cantileverly supported and extend away from the web in opposite directions. This construction allows the contact to be inserted into the socket from either end and the tab which is inserted first, the leading tab, is resiliently deformed by either the first stop member 94 or the flat surface 56. Again, the spacing between the free ends of the table is substantially equal to the longitudinal distance between the two surfaces 94 and 60 of the stop members.

For ease of manufacture, the housing 42, the side panels 58 and 80 including the jaws, the rib 44, the rim 46 and stop member 94 may be molded as a unitary structure. When this is so, the material in each section has the same electrical and temperature characteristics. In a similar manner, all of the several features of the contact members 38–40 may be formed from a single piece of material. It has been found that three-quarter hard brass combines the resilient characteristics required by the tabs along with the electrical conductivity characteristics required of the contact members.

FIG. 11 illustrates a modification of the contact member 39 of FIG. 9 to which has been added a filament wire guide and straightening structure in the form of a raised rib 106 on the detent 34 thereof. The rib 106 is struct out from the inner curved surface of one of the detents 36 of a contact member, as by swaging or rolling, to form a raised, longitudinally extending curvilinear ridge adjacent the inwardly facing side thereof as shown in FIG. 12. The ridge 106 thus locates between the vent tube of the bulb base and the exit of a filament wire on the wedge base and serves to guide the filament wire, straightening it in the event the wire should be bent as indicated in FIG. 14, as the bulb base is inserted in the aforementioned throat formed between an opposed pair of contact members as shown in FIGS. 13 and 14A.

There has thus been shown and described a snap-in socket for wedge base lamps with contact members therefor which permit contact insertion from either end of the socket as required and further featuring filament wire guide and straightening structure on the contact members.

What is claimed is:

1. A snap-in socket assembly for receiving, locating and positioning within an aperture in a mounting panel a wedge bulb having a pair of filament extension wires positioned externally on opposite sides of the wedge base and overlying a pair of in-line troughs extending transversely to the wedge base, said socket comprising:

an elongated tubular electrically non-conductive housing, a rib within said housing and longitudinally extending from substantially near one end to the other end of said housing and dividing said housing into two sections, a radially extending rim girding said housing at said other end, at least two opposed resilient jaw members cantileverly supported from said other end of said housing and extending from said rim, said jaw members having a C-shaped cross section centered on either side of the plane defined by said rib, a pair of elongated electrically conductive contact members each located in a different one of the said housing sections and extending between said opposed resilient jaws which compressively engage said contact members upon the insertion of the bulb therebetween and cause the contact members to compressively engage the filament wires on the wedge base of the bulb, and a protuberance on the outside surface of each of said resilient jaw members and longitudinally spaced from said rim a predetermined distance substantially equal to the depth of the aperture in the panel, each of said contact members having a wire contact end and a bulb contact end in the shape of a channel having a wing outwardly extending from each of the side walls of said channel substantially parallel to the bottom web of said channel and longitudinally extending beyond the end of said channel, said wings adapted to be located in both of said C-shaped jaws and having a detent protuberance thereon adapted for engaging the trough on the bulb, said wings of each of said contact members positioned within said jaws opposing the wings of the opposite contact member.

2. A snap-in socket assembly according to claim 1 wherein said housing has a pair of flat surfaces extending longitudinally along the inner surface of said housing and facing said rib and wherein said wire contact end of said contact member has an end tab extending angularly away from the said bottom web in a direction opposite to the said wings thereof whereby said tab member on each contact member and said adjacent flat surface of said housing cooperate to maintain said wings of said contact members respectively in a spaced apart relationship.

3. A snap-in socket assembly according to claim 2 wherein said contact members each addditionally include a resilient tab cantileverly supported from each of said wings and spaced from said protuberance thereon, said tab angularly extending in a direction away from said bottom web for cooperating with said housing rib, said contact member end tab and said adjacent flat surface of said housing for compressively holding said contact member within said C-shaped jaws of said housing.

4. A snap-in socket assembly according to claim 1 additionally including a pair of spaced apart stop members located within each section of said housing, a first stop member located on and intermediate the ends of said rib and a second stop member located on the inner surface of said housing longitudinally displaced from said first stop member toward the other end of said housing, and a pair of oppositely extending spaced apart tab members on said bottom web of said contact members, said tab members cooperating with said stop members in said housing for retaining said contact members in said socket against forces external to said socket.

5. A snap-in socket assembly according to claim 4 wherein said pair of oppositely extending spaced apart tab members of a contact member comprise a first resilient cantileverly supported tab member extending away from said web from a point intermediate the ends of said channel and having its free end extending toward said other end of said housing and a second resilient cantileverly supported tab member spaced from said first tab in a direction toward said other end of said housing and having its free end extending away from said other end and longitudinally spaced from the free end of said first tab member, whereby said contact member is inserted into said socket from either end and said free ends of said tabs respectively cooperate with said stop members in said housing for retaining said contact in said socket against forces external to said socket.

6. A snap-in socket assembly according to claim 4 wherein said pair of oppositely extending spaced apart tab members on a contact member comprise a first resilient cantileverly supported tab member angularly extending away from said bottom web at an acute angle to the web and a second tab member extending normally from said bottom web whereby said contact member is inserted into said socket with the end of said contact adjacent to said cantileverly supported tab inserted first.

7. A wedge-shaped lamp socket contact member for attachment to the end of a wire comprising:

an elongated member having a contact end portion and wire attachment end portion, said member having a bottom web extending along both portions, said contact end portion comprising interconnecting two spaced apart parallel side members connected to said web and longitudinally extending from one end of said web to a point intermediate the ends, a wing member extending longitudinally from each of said side members and substantially parallel to and displaced from said bottom web, a free end of said wing member longitudinally extending beyond said side member, a protuberance transversely extending across each of said wings and displaced from said free end, a first resilient cantileverly supported tab angularly extending from said bottom web at a point intermediate the ends of contact end portion and in a direction opposite to said side members, the free end of said tab extending toward the wire end portion of said elongated member, and a second resilient tab spaced from said first resilient tab in a direction toward said wire end of said elongated member, said second tab cantileverly supported and angularly extending in a direction toward the plane formed by said wing members, the free end thereof extending toward the contact end of said elongated member, said first and second tab members cooperating for retaining said contact member in a wedge base lamp socket.

8. A contact according to claim 3 additionally including a third resilient tab cantileverly supported from each of said wing members, the free end thereof extending in the direction away from said bottom web, and a fourth tab member extending outwardly and away from said wire end of said elongated member in a direction opposite to said third tab member, said fourth tab member cooperating with said third tab member for compressively holding said contact in the socket.

9. A lamp socket contact member for a wedge base lamp bulb of the type having a bulbular filament enclosing portion and a flattened base having a centrally located sealed vent tube with a pair of oppositely laterally extending wings therefrom, each of said wings having a pair of in-line trough-like indentations formed in and extending transversely on each face thereof and a bulb filament wire extending internally in one direction therethrough and externally in the opposite direction and overlying a trough-like indentation in one face of a different one of the wings of the wedge base, said contact member having a generally channel-shaped, longitudinally extending portion with spaced sidewalls joined by a substantially flat web portion, each of said sidewalls having a wing extending laterally outwardly therefrom substantially parallel to said web portion and longitudinally of said contact member and past the end of the web portion thereof, each of said wings of said contact member having a curved portion forming a detent protuberance thereon adapted to engage in a trough-like indentation on the wedge base of a bulb, one of said protuberances having a guide means formed thereon for guiding and straightening of a bent external filament wire on the base of said bulb when the bulb base is inserted between an opposed pair of such contact members in a lamp socket.

10. A lamp socket contact member in accordance with claim 9 above wherein said wire guide straightening means is positioned on a wing adjacent a sidewall of said contact member to locate between the vent tube of the bulb base and the exit of a filament wire therefrom.

* * * * *